United States Patent [19]

Mega et al.

[11] Patent Number: 5,231,335
[45] Date of Patent: Jul. 27, 1993

[54] DOUBLE SPINDLE SYNCHRONOUS DRIVING APPARATUS

[75] Inventors: Hirotaka Mega, Kadoma; Saburo Kubota, Katano, both of Japan

[73] Assignee: Matsushita Electric Industrial Co., Ltd., Osaka, Japan

[21] Appl. No.: 904,728

[22] Filed: Jun. 26, 1992

[30] Foreign Application Priority Data

Jun. 28, 1991 [JP] Japan ............................ 3-158511

[51] Int. Cl.⁵ ............................................. H02P 5/00
[52] U.S. Cl. ....................................... 318/85; 318/625; 901/20
[58] Field of Search ............... 318/66, 68, 69, 77, 318/78, 85, 705, 715, 717–723, 625, 631, 568.11, 562.58, 562.22; 364/468, 470, 474.01, 474.02, 474.12, 474.15, 474.3; 901/3, 9, 26

[56] References Cited

U.S. PATENT DOCUMENTS

| | | | |
|---|---|---|---|
| 4,899,286 | 2/1990 | Colli et al. | 364/470 |
| 4,988,937 | 1/1991 | Yoneda et al. | 318/85 X |
| 5,060,161 | 10/1991 | Sainen | 364/470 |
| 5,083,066 | 1/1992 | Kohari et al. | 318/77 X |
| 5,086,263 | 2/1992 | Kubota et al. | 318/568.11 |
| 5,134,568 | 7/1992 | Sainen | 364/470 |

Primary Examiner—Jonathan Wysocki
Attorney, Agent, or Firm—Wenderoth, Lind & Ponack

[57] ABSTRACT

A double spindle synchronous driving apparatus for synchronously driving first and second spindles, including: first and second motors for driving the first and second spindles, respectively; first and second rotational detection members for detecting rotational positions of the first and second motors so as to output first and second detection signals, respectively; first and second deviation counters which outputs first and second deviation signals in response to a position command signal and the first detection signal and in response to the position command signal and the second detection signal, respectively; a correction member which formulates first and second correction signals for the first and second deviation signals, respectively in accordance with a difference between the first and second deviation signals by fuzzy inference; first and second arithmetic members for performing arithmetic operation of the first deviation signal and the first correction signal and of the second deviation signal and the second correction signal so as to output first and second control signals, respectively; and first and second drive members for driving the first and second motors on the basis of the first and second control signals, respectively.

9 Claims, 4 Drawing Sheets

DOUBLE SPINDLE SYNCHRONOUS DRIVING APPARATUS

BACKGROUND OF THE INVENTION

The present invention relates to a double spindle synchronous driving apparatus which can be suitably employed as a driving apparatus for driving two spindles in highly accurate synchronism in a robot or the like.

For example, FIG. 1 shows a known robot for performing various operations at high positional accuracy relative to a workpiece. The known robot includes a Y-axis table 31, an X-axis table 32 which can be positioned at an arbitrary position in the direction of the Y-axis by the Y-axis table 31 and a working head 33 which ca be positioned at an arbitrary position in the direction of the X-axis by the X-axis table 32. A position recognizing means 34 and a working means 35 are provided on the working head 33 so as to be spaced a predetermined distance from each other in the direction of the X-axis.

However, in the known robot of the above mentioned arrangement, since the X-axis table 32 longitudinally extends over a long distance in the direction of the X-axis from the Y-axis table 31, the following problem arises. Namely, even if the X-axis table 32 is longitudinally inclined quite minutely, positioning error of the working head 33 in the direction of the Y-axis is produced when the working head 33 is displaced along the X-axis table 32 after the X-axis table 32 has been positioned in the direction of the Y-axis.

In order to solve the above mentioned problem, such an arrangement as shown in FIG. 4 may be employed. In the arrangement, a pair of Y-axis tables 1 and 2 are provided in parallel with each other so as to position opposite end portions of an X-axis table 7 in the direction of the Y-axis, respectively such that a working head 10 is positioned in the direction of the X-axis by the X-axis table 7. In the robot of the above described arrangement, if a pair of Y-axis motors 3 and 4 provided for the Y-axis tables 1 and 2 are not driven in highly accurate synchronism, the X-axis table 7 cannot be displaced stably.

Conventionally, an arrangement shown in FIG. 2 has been generally employed in a driving apparatus for synchronously driving two spindles. In the known arrangement, detection signals of pulse generators 43 and 44 for detecting rotational positions of motors 41 and 42 are applied to deviation counters 45 and 46 provided for motors 41 and 42, respectively, while a common position command signal is inputted to the deviation counter 45 and 46. A motor drive circuit 47 for the motor 41 is controlled on the basis of a deviation signal outputted from the deviation counter 45 and indicative of a deviation between the detection signal of the pulse generator 43 and the position command signal. Likewise, a motor drive circuit 48 for the motor 42 is controlled on the basis of a deviation signal outputted from the deviation counter 46 and indicative of a deviation between the detection signal of the pulse generator 44 and the position command signal. Meanwhile, the detection signals of the pulse generators 43 and 44 are also, respectively, inputted to frequency/voltage (FV) converters 49 and 50 and output signals of the FV converters 49 and 50 are applied to the motor drive circuits 47 and 48, respectively so as to perform speed compensation of the motors 41 and 42.

However, in the prior art double spindle synchronous driving apparatus of the arrangement shown in FIG. 2, since the two motors 41 and 42 are controlled in response to the position command independently of each other such that the deviation between the commanded position and the detected position of each of the motors 41 and 42 assumes zero, such an inconvenience is incurred. Namely, even in the case where, for example, a large delay happens between the commanded position and the detected position of only one of the motors 41 and 42 in a fixed speed driving state for some reason or other, the other of the motors 41 and 42 will maintain its predetermined operational state. Therefore, asynchronism between the motors 41 and 42 is not eliminated quickly and thus, it is difficult to achieve highly accurate synchronous driving.

SUMMARY OF THE INVENTION

Accordingly, an essential object of the present invention is to provide a double spindle synchronous driving apparatus which is capable of driving two spindles in highly accurate synchronism.

In order to accomplish this object of the present invention, a double spindle synchronous driving apparatus for synchronously driving first and second spindles, according to the present invention comprises: first and second motors for driving said first and second spindles, respectively; first and second rotational detection means for detecting rotational positions. Of said first and second motors so as to output first and second detection signals, respectively; a first deviation counter which receives a position command signal and the first detection signal so as to output a first deviation signal; a second deviation counter which receives the position command signal and the second detection signal so as to output a second deviation signal; a correction means which formulates first and second correction signals for the first and second deviation signals, respectively in accordance with a difference between the first and second deviation signals by fuzzy inference; a first arithmetic means for performing arithmetic operation of the first deviation signal and the first correction signal so as to output a first control signal; a second arithmetic means for performing arithmetic operation of the second deviation signal and the second correction signal so as to output a second control signal; and first and second drive means for driving said first and second motors on the basis of the first and second control signals, respectively.

In accordance with the present invention, when a large delay of one motor from the other motor is produced in the double spindle synchronous driving apparatus, the respective motor drive means are controlled by the control signals obtained by performing arithmetic operation of the deviation signals of the motors and the correction signals which are formulated in accordance with the difference between the deviation signals by fuzzy inference. Therefore, drive current corrected to be larger than that based on one corresponding deviation signal only is applied to one motor, while drive current corrected to be smaller than that based on the other corresponding deviation signal only is applied to the other motor. Consequently, synchronous drive of the motors is secured rapidly.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
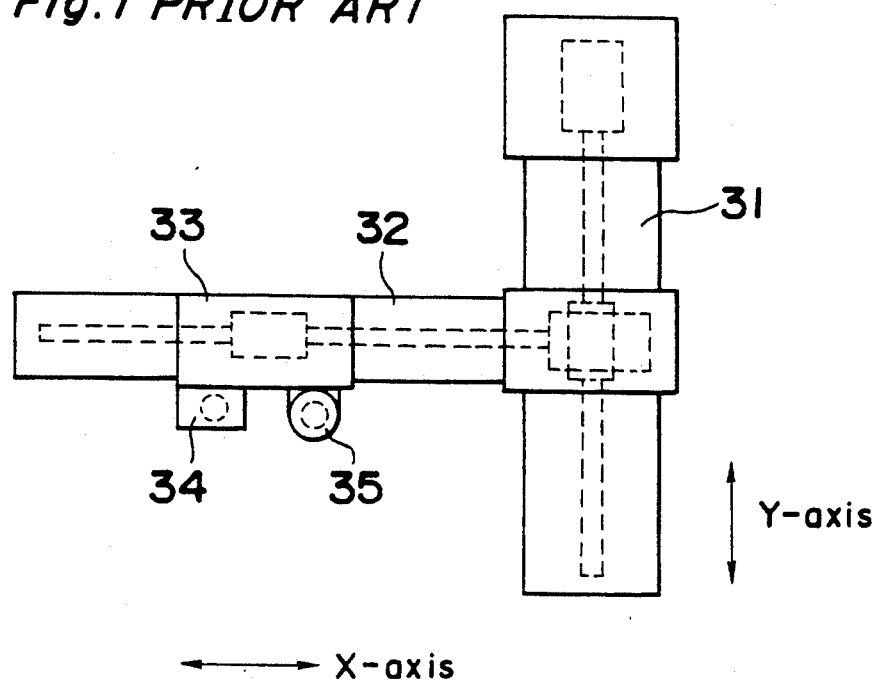
FIG. 1 is a top plan view of a prior art robot (already referred to)
Figure 2:
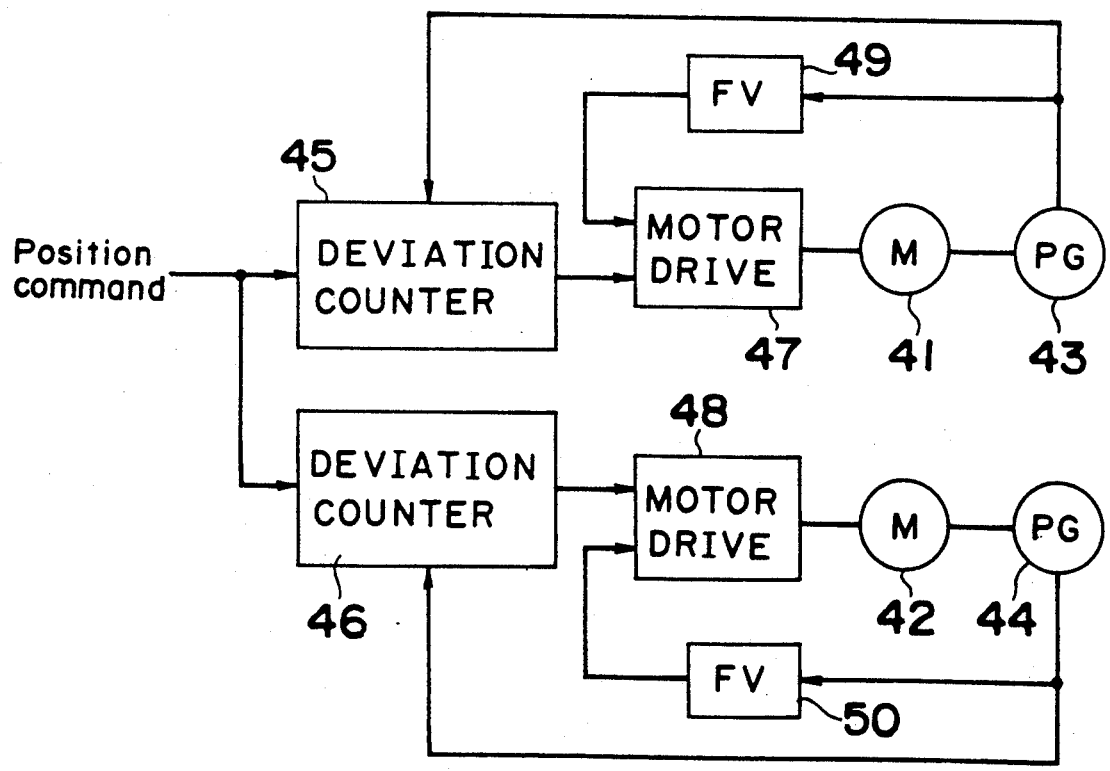
FIG. 2 is a block diagram of a prior art double spindle synchronous driving apparatus (already referred to)
Figure 3:
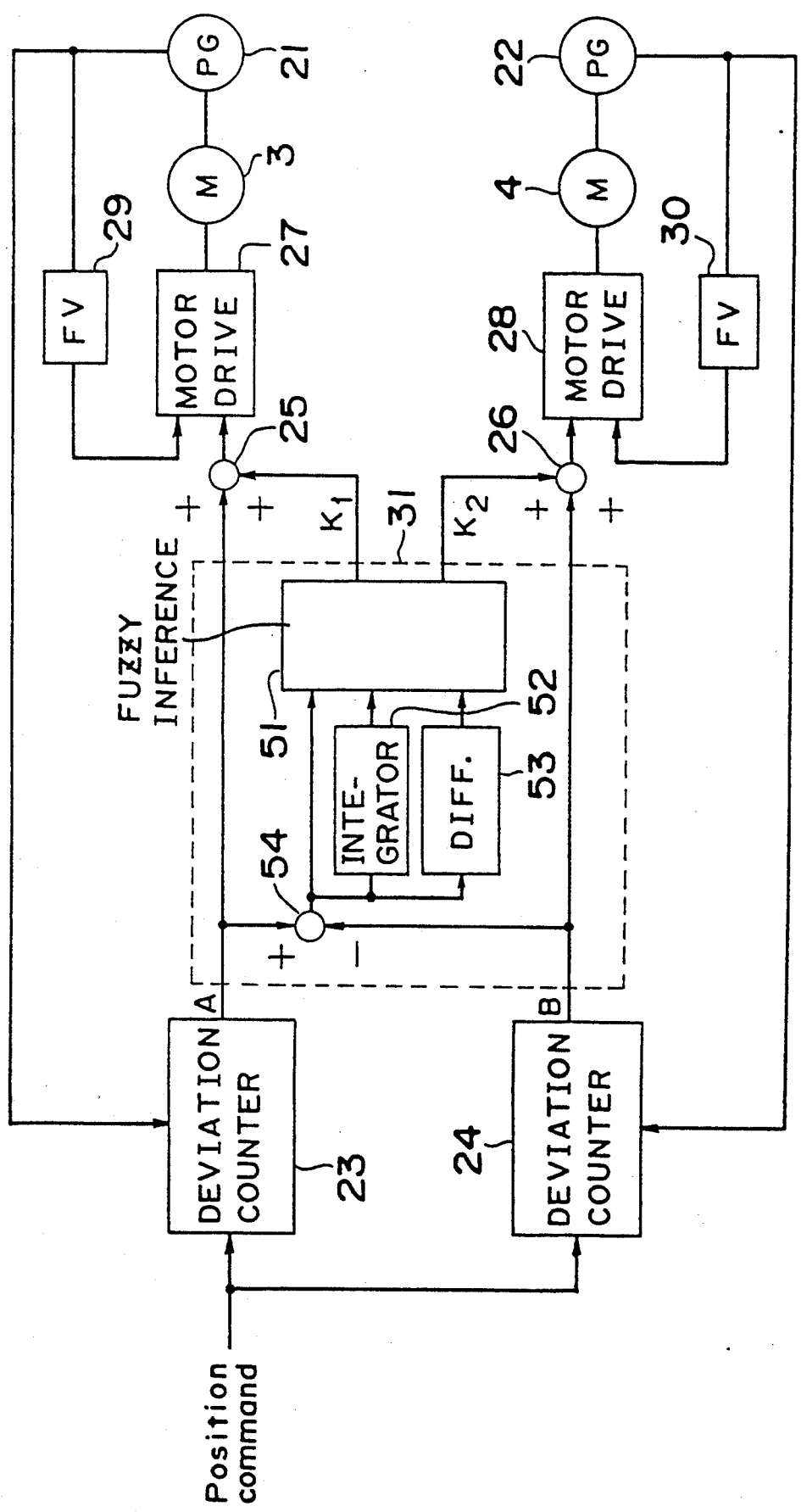
FIG. 3 is a block diagram of an X-axis table driving apparatus, to which a double spindle synchronous driving apparatus according to one embodiment of the present invention is applied.
Figure 4:
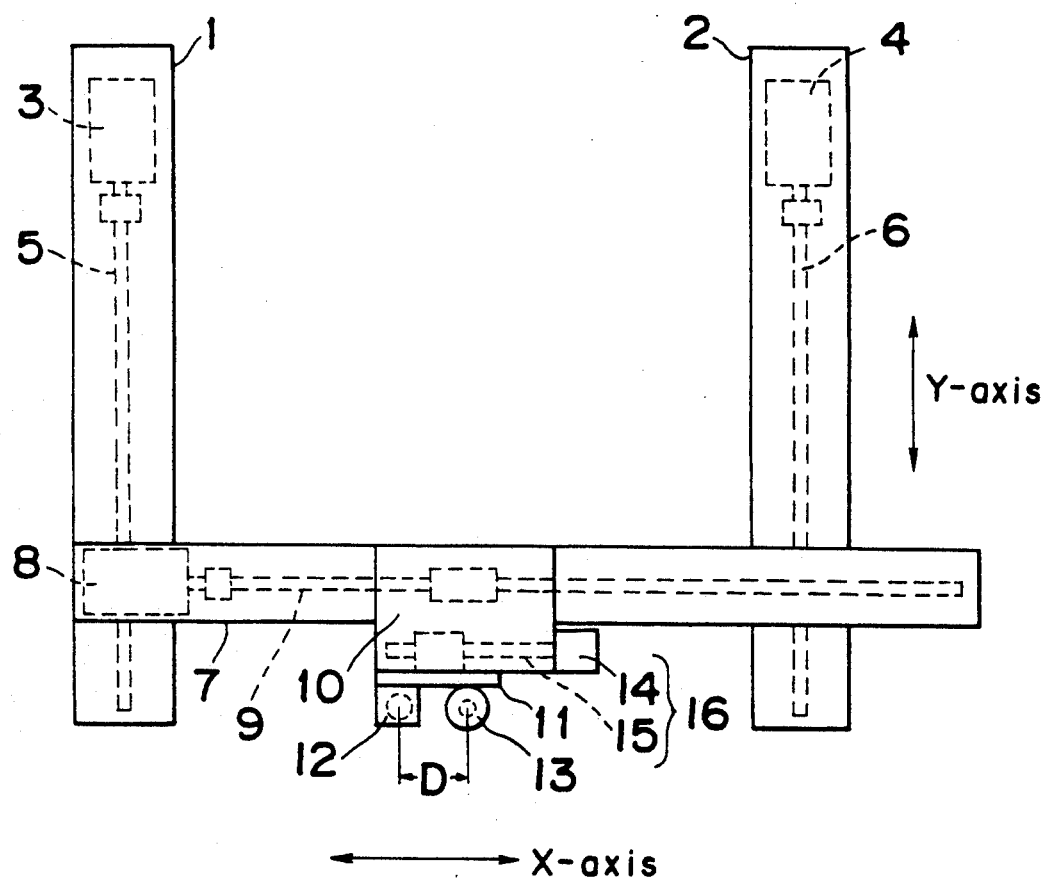
FIG. 4 is a top plan view of a robot incorporating the X-axis table driving apparatus of FIG. 3.

Referring now to the drawings, there is shown in FIG. 3, an X-axis table driving apparatus of a robot, to which a double spindle synchronous driving apparatus according to one embodiment of the present invention is applied. The robot is shown in FIG. 4. In the robot of FIG. 4, a pair of Y-axis tables 1 and 2 are provided in parallel with each other so as to be spaced a predetermined distance from each other. The Y-axis table 1 includes a Y-axis motor 3 and a Y-axis ball screw 5, while the Y-axis table 2 includes a Y-axis motor 4 and a Y-axis ball screw 6. An X-axis table 7 is driven by the Y-axis motors 3 and 4 so as to be displaced in the direction of the Y-axis along the Y-axis tables 1 and 2 and is positioned at an arbitrary position in the direction of the Y-axis. The X-axis table 7 includes an X-axis motor 8 and an X-axis ball screw 9. A movable member 10 is driven by the X-axis motor 8 so as to be displaced in the direction of the X-axis along the X-axis table 7 and is positioned at an arbitrary position in the direction of the X-axis.

A working head 11 is movably mounted on the movable member 10. A position recognizing camera 12 for recognizing a working position and a working tool 13 for performing a necessary operation on a workpiece are secured to the working head 11 so as to be spaced a predetermined distance D from each other in the direction of the X-axis. In the embodiment shown in FIG. 4, axis of the position recognizing camera 12 is accurately aligned with that of the working tool 13 in the direction of the X-axis. The working head 11 is movably mounted on the movable member 10 so as to be displaced in the direction of the X-axis highly accurately relative to the movable member 10. A travel stroke of the working head 11 substantially corresponds to the distance D between the position recognizing camera 12 and the working tool 13. A precision positioning means 16 is provided for displacing the working head 11 relative to the movable member 10 so as to position the working head 11 highly accurately and includes a precision motor 14 and a precision ball screw 15.

Then, the X-axis table driving apparatus for driving the X-axis table 7 through synchronous drive of the Y-axis ball screws 5 and 6 by the Y-axis motors 3 and 4 is described with reference to FIG. 3. Detection signals of pulse generators 21 and 22 for detecting rotational positions of the Y-axis motors 3 and 4 are applied to deviation counters 23 and 24 provided for the Y-axis motors 3 and 4, respectively, while a common position command signal is inputted to the deviation counters 23 and 24. A deviation signal A outputted from the deviation counter 23 and indicative of a deviation between the position command signal and the detection signal of the pulse generator 21 is inputted not only to an adder 25 but to a correction circuit 31. Similarly, a deviation signal B outputted from the deviation counter 24 and indicative of a deviation between the position command signal and the detection signal of the pulse generator 22 is inputted not only to an adder 26 but to the correction circuit 31. Thus, correction signals $K_1$ and $K_2$ corresponding to the Y-axis tables 3 and 4, respectively are outputted from the correction circuit 31 so as to be applied to the adders 25 and 26, respectively.

A signal $(A+K_1)$ obtained by adding the deviation signal A from the adder 25 and the correction signal $K_1$ from the correction circuit 31 is inputted to a motor drive circuit 27 for controlling drive of the Y-axis motor 3. Likewise, a signal $(B+K_2)$ obtained by adding the deviation signal B from the adder 26 and the correction signal $K_2$ from the correction circuit 31 is inputted to a motor drive circuit 28 for controlling drive of the Y-axis motor 4. Meanwhile, the detection signals of the pulse generators 21 and 22 are also, respectively, applied to frequency/voltage (FV) converters 29 and 30 and outputs of the FV converters 29 and 30 are inputted to the motor drive circuits 27 and 28, respectively so as to perform speed compensation of the Y-axis motors 3 and 4.

Figure 6:
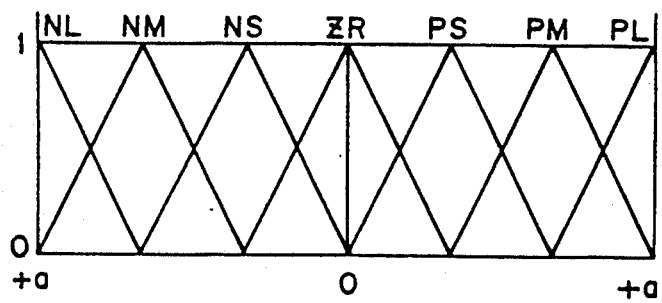
FIG. 6 is a diagram showing a membership function of the fuzzy inference portion of FIG. 5.

The correction circuit 31 is constituted by a subtracter 54 for subtracting the deviation signal B of the deviation counter 24 from the deviation signal A of the deviation counter 23 so as to obtain a difference $(A-B)$, an integrator 52 for integrating the difference $(A-B)$, a differentiator 53 for differentiating the difference $(A-B)$ and a fuzzy inference portion 51. Inputs of the fuzzy inference portion 51 are the difference $(A-B)$, the integral value of the difference $(A-B)$ and the differential value of the difference $(A-B)$, while outputs of the fuzzy inference portion 51 are the correction signals $K_1$ and $K_2$. However, since relation of $(K_2=-K_1)$ exists, the fuzzy inference portion 51 is based on a rule format having three conditions and one conclusion. As shown in FIG. 6, each of membership functions at three points of the condition parts and at one point of the conclusion part employs seven labels and has a symmetric shape of isosceles triangle. Meanwhile, maximums of the membership functions in the abscissa are, respectively, set at optimum values experimentally. The seven labels are NL (negative large), NM (negative medium), NS (negative small), ZR (nearly zero), PS (positive small), PM (positive medium) and PL (positive large).

In this embodiment, the following 10 rules R1−R10 are used. It is assumed here that $I_1$ denotes the difference $(A-B)$, $I_2$ denotes the integral value of the difference $(A-B)$ and $I_3$ denotes the differential value of the difference $(A-B)$.

Figure 5:
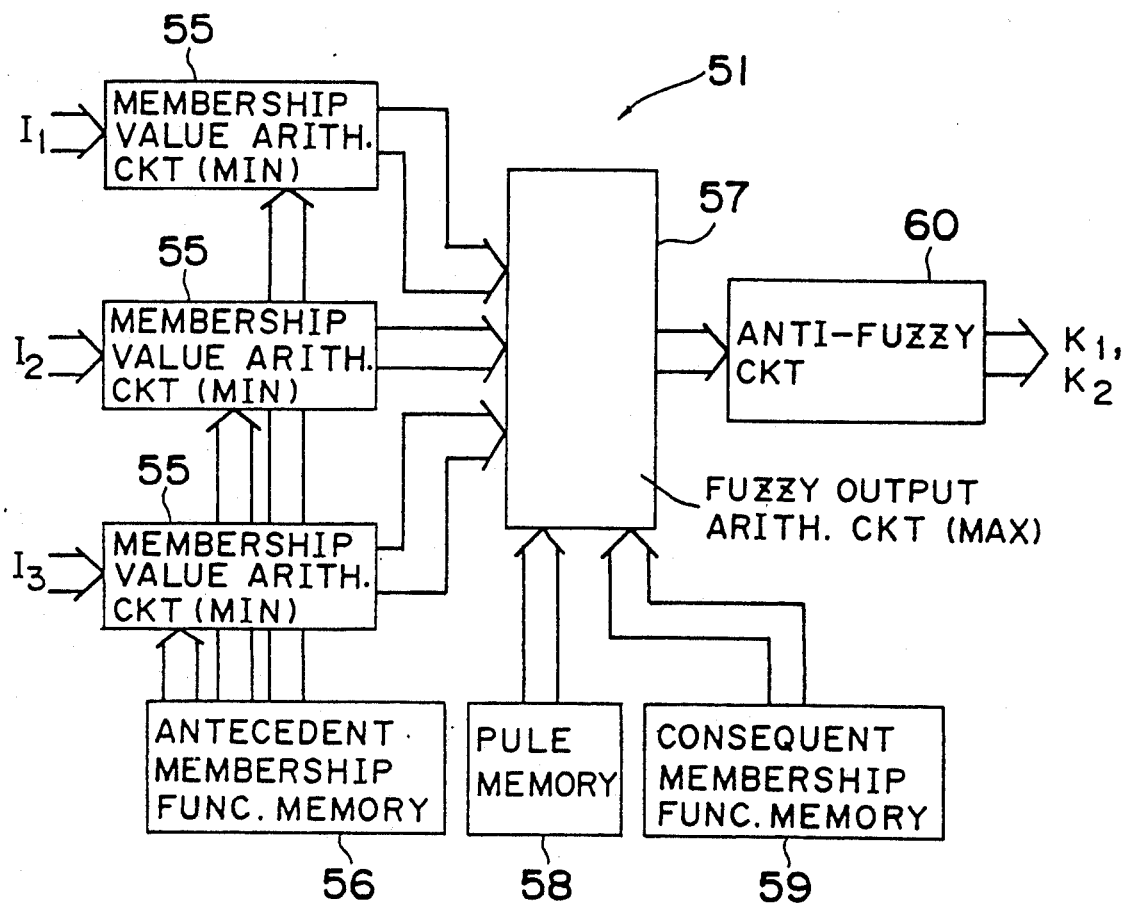
FIG. 5 is a block diagram of a fuzzy inference portion employed in the X-axis table driving apparatus of FIG. 3.

R1: If $I_1 = NM$, $I_3 = ZR$ then $K_1 = NM$
R2: If $I_1 = NS$, $I_3 = NS$ then $K_1 = NS$
R3: If $I_1 = NS$, $I_3 = PS$ then $K_1 = ZR$
R4: If $I_1 = PS$, $I_3 = NS$ then $K_1 = ZR$
R5: If $I_1 = PS$, $I_3 = PS$ then $K_1 = PS$
R6: If $I_1 = ZR$, $I_2 = PM$, $I_3 = ZR$ then $K_1 = PM$
R7: If $I_1 = ZR$, $I_2 = PS$, $I_3 = ZR$ then $K_1 = PS$
R8: If $I_1 = ZR$, $I_2 = ZR$, $I_3 = ZR$ then $K_1 = ZR$
R9: If $I_1 = ZR$, $I_2 = NS$, $I_3 = ZR$ then $K_1 = NS$
R10: If $I_1 = ZR$, $I_2 = NM$, $I_3 = ZR$ then $K_1 = NM$ Hereinbelow, configuration of the fuzzy inference portion 51 is described with reference to FIG. 5. The difference (A−B), the integral value of the difference (A−B) and the differential value of the difference (A−B) are inputted to three membership value arithmetic circuits 55, respectively. The membership value arithmetic circuits 55 read out membership functions stored in an antecedent membership function memory 56, respectively and obtain respective membership values by calculating through fuzzy MIN arithmetic operation how well the current inputs match with each label so as to output the membership values to a fuzzy output arithmetic circuit 57. The fuzzy output arithmetic circuit 57 reads out rules stored in a rule memory 58 and membership functions regarding the signal $K_1$, stored in a consequent membership function memory 59 and obtains a $K_1$ fuzzy output through fuzzy MAX arithmetic operation so as to deliver the $K_1$ fuzzy output to an anti-fuzzy circuit 60. The anti-fuzzy circuit 60 is a circuit for changing the $K_1$ fuzzy output of the fuzzy output arithmetic circuit 57 to a definite value by method of center of gravity.

Then, operation of the X-axis table driving apparatus of the above described arrangement is described. In case an operation is performed at a predetermined working position by the working tool 13, the movable member 10 is displaced in the directions of the Y-axis and the X-axis by not only driving the X-axis table 7 in the direction of the Y-axis along the Y-axis tables 1 and 2 by the Y-axis motors 3 and 4 but driving the movable member 10 in the direction of the X-axis along the X-axis table 7 by the X-axis motor 8. Furthermore, after the working position has been detected by the position recognizing camera 12 in the working head 11, position of the working head 11 is adjusted such that axis of the position recognizing camera 12 coincides with the working position highly accurately. In this positioned state of the movable member 10, the opposite end portions of the X-axis table 7 are positioned by a pair of the Y-axis tables 1 and 2. Therefore, even if a distance between the Y-axis tables 1 and 2 is rather long, the X-axis table 7 is securely held in a posture oriented in the direction of the X-axis at high accuracy, so that the working head 11 can be displaced in the direction of the X-axis highly accurately.

Meanwhile, by synchronously driving the Y-axis motors 3 and 4, the X-axis table 7 is displaced in a posture oriented in the direction of the X-axis. Moreover, in the case where, for example, rotational position of the Y-axis motor 3 is delayed from that of the Y-axis motor 4 for some reason or other during synchronous drive of the Y-axis motors 3 and 4 in response to the position command signal, the deviation signal A becomes large relative to the deviation signal B. Then, in the Y-axis motor 3, the motor drive circuit 27 is controlled on the basis of a signal obtained by adding to the deviation signal A, the positive correction signal $K_1$ based on the difference (A−B). Meanwhile, in the Y-axis motor 4, the motor drive circuit 28 is controlled on the basis of a signal obtained by adding to the deviation signal B, the negative correction signal $K_2$ based on the difference (B−A). Therefore, drive current corrected to be larger than that based on the deviation signal A is applied to the Y-axis motor 3, while drive current corrected to be smaller than that based on the deviation signal B is applied to the Y-axis motor 4. As a result, deviation in rotational position between the Y-axis motors 3 and 4 is eliminated rapidly and thus, highly accurate synchronous drive of the Y-axis motors 3 and 4 is secured.

After the X-axis table 7 has been positioned at a predetermined position in the direction of the Y-axis so as to be oriented in the direction of the X-axis highly accurately as described above, the working head 10 is displaced accurately through the distance D between axis of the position recognizing camera 12 and that of the working tool 13, so that axis of the working tool 13 can coincide with the working position at high accuracy. By actuating the working tool 13 in this state, the working tool 13 can be operated at high positional accuracy.

Meanwhile, in the above described embodiment, the correction signals $K_1$ and $K_2$ are added to the deviation signals A and B for the Y-axis motors 3 and 4, respectively such that drive of both of the Y-axis motors 3 and 4 is corrected. However, in the case where the difference (A−B) is small, it is also possible to employ an arrangement in which only one correction signal is added to a corresponding one of the deviation signals such that drive of only one of the Y-axis motors is corrected. In this case, since only one of the adders 25 and 26 is used, the other of the adders 25 and 26 may be eliminated.

As is clear from the foregoing description, when a large delay of one motor from the other motor is produced in the double spindle synchronous driving apparatus of the present invention, the respective motor drive means are controlled by the control signal obtained by adding to the deviation signals of the motors, the correction signals which are formulated in accordance with the difference between the deviation signals, the differential value of the difference and the integral value of the difference by fuzzy inference based on the preset membership functions and control rules. Therefore, drive current corrected to be larger than that based on one corresponding deviation signal only is applied to one motor, while drive current corrected to be smaller than that based on the other corresponding deviation signal only is applied to the other motor. Consequently, synchronous drive of the motors is secured rapidly and the motors can be driven in highly accurate synchronism.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A double spindle synchronous driving apparatus for synchronously driving first and second spindles, comprising:
   first and second motors for driving said first and second spindles, respectively;
   first and second rotational detection means for detecting rotational positions of said first and second motors so as to output first and second detection signals, respectively;

a first deviation counter which receives a position command signal and the first detection signal so as to output a first deviation signal;

a second deviation counter which receives the position command signal and the second detection signal so as to output a second deviation signal;

a correction means which formulates first and second correction signals for the first and second deviation signals, respectively in accordance with a difference between the first and second deviation signals by fuzzy inference;

a first arithmetic means for performing arithmetic operation of the first deviation signal and the first correction signal so as to output a first control signal;

a second arithmetic means for performing arithmetic operation of the second deviation signal and the second correction signal so as to output a second control signal; and first and second drive means for driving said first and second motors on the basis of the first and second control signals, respectively.

2. A double spindle synchronous driving apparatus as claimed in claim 1, wherein the fuzzy inference is based on preset membership functions and control rules.

3. double spindle synchronous driving apparatus as claimed in claim 1, wherein said correction means includes a subtracter for subtracting the second deviation signal from the first deviation signal, an integrator for integrating the difference, a differentiator for differentiating the difference and a fuzzy inference portion.

4. A double spindle synchronous driving apparatus as claimed in claim 3, wherein said fuzzy inference portion includes first, second and third membership value arithmetic circuits for receiving the difference, an integral value of the difference and a differential value of the difference from said subtracter, said integrator and said differentiator, respectively, an antecedent membership function memory connected to said first, second and third membership value arithmetic circuits, a rule memory, a consequent membership function memory, a fuzzy output arithmetic circuit for generating a fuzzy output on the basis of outputs from said first, second and third membership value arithmetic circuits and contents stored in said rule memory and said consequent membership function memory and an anti-fuzzy circuit for changing the fuzzy output of said fuzzy output arithmetic circuit to a definite value.

5. A double spindle synchronous driving apparatus as claimed in claim 1, wherein said first and second arithmetic means are first and second adders, respectively.

6. A double spindle synchronous driving apparatus for synchronously driving first and second spindles, comprising:

first and second motors for driving said first and second spindles, respectively;

first and second rotational detection means for detecting rotational positions of said first and second motors so as to output first and second detection signals, respectively;

a first deviation counter which receives a position command signal and the first detection signal so as to output a first deviation signal;

a second deviation counter which receives the position command signal and the second detection signal so as to output a second deviation signal;

a correction means which formulates first and second correction signals for the first and second deviation signals, respectively in accordance with a difference between the first and second deviation signals by fuzzy inference;

at least one arithmetic means for performing arithmetic operation of one of the first and second deviation signals and a corresponding one of the first and second correction signals so as to output a control signal; and first and second drive means for driving said first and second motors, respectively such that the control signal from said arithmetic meals is applied to a corresponding one of said first and second drive means.

7. A double spindle synchronous driving apparatus as claimed in claim 6, which comprises first and second arithmetic means, said first arithmetic means performing arithmetic operation of the first deviation signal and the first correction signal so as to output a first control signal, said second arithmetic means for performing arithmetic operation of the second deviation signal and the second correction signal so as to output a second control signal such that the first and second control signals are, respectively, applied to said first and second drive means.

8. A double spindle synchronous driving apparatus as claimed in claim 6, wherein said arithmetic means is an adder.

9. A double spindle synchronous driving apparatus as claimed in claim 7, wherein said first and second arithmetic means are first and second adders, respectively.

* * * * *